(12) United States Patent
Beck et al.

(10) Patent No.: US 9,175,752 B2
(45) Date of Patent: Nov. 3, 2015

(54) MULTI-SPEED GEARBOX

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/396,071

(22) PCT Filed: Mar. 13, 2013

(86) PCT No.: PCT/EP2013/055079
§ 371 (c)(1),
(2) Date: Oct. 22, 2014

(87) PCT Pub. No.: WO2013/160002
PCT Pub. Date: Oct. 31, 2013

(65) Prior Publication Data
US 2015/0051044 A1   Feb. 19, 2015

(30) Foreign Application Priority Data

Apr. 25, 2012   (DE) .......................... 10 2012 206 774

(51) Int. Cl.
*F16H 3/62* (2006.01)
*F16H 3/44* (2006.01)
(Continued)

(52) U.S. Cl.
CPC .......... *F16H 3/666* (2013.01); *F16H 2003/445* (2013.01); *F16H 2200/0065* (2013.01);
(Continued)

(58) Field of Classification Search
CPC ................ F16H 2200/2012; F16H 2200/2046; F16H 2200/0065; F16H 2200/2097
See application file for complete search history.

(56) References Cited

U.S. PATENT DOCUMENTS 3,956,946 A * 5/1976 Murakami et al. ............ 475/276
3,999,448 A * 12/1976 Murakami et al. ............ 475/276
(Continued)

FOREIGN PATENT DOCUMENTS

DE   29 36 969 A1   4/1981
DE   199 12 480 A1   9/2000
(Continued)

OTHER PUBLICATIONS

German Search Report Corresponding to 10 2012 206 808.2 mailed Nov. 13, 2012.
(Continued)

*Primary Examiner* — Tisha Lewis
(74) *Attorney, Agent, or Firm* — Davis & Bujold, P.L.L.C.; Michael J. Bujold

(57) ABSTRACT

Transmission with four gear sets, shafts and six shift elements. Sun of first set is connected to fifth shaft, which is couplable to housing by second brake and connectable by first clutch to driveshaft, which is connectable to seventh shaft connected by second clutch to carrier of second set and is connectable by third clutch to eighth shaft connected to carrier of first set and to sun of second set. Seventh shaft is connectable to third shaft connected to ring gear of third set by fourth clutch. Sixth shaft is connected to ring gear of second set and carrier of fourth set. Fourth shaft is connected to ring gear of first set and to sun of fourth set and is couplable to housing by first brake. Sun of third set is coupled to housing. Output shaft is connected to carrier of third set and to ring gear of fourth set.

16 Claims, 1 Drawing Sheet

(51) Int. Cl.
- *F16H 3/68* (2006.01)
- *F16H 37/06* (2006.01)
- *F16H 3/66* (2006.01)

(52) U.S. Cl.
CPC . *F16H2200/0082* (2013.01); *F16H 2200/2012* (2013.01); *F16H 2200/2046* (2013.01); *F16H 2200/2094* (2013.01); *F16H 2200/2097* (2013.01)

(56) References Cited

U.S. PATENT DOCUMENTS

| | | | |
|---|---|---|---|
| 4,038,888 A * | 8/1977 | Murakami et al. | 475/276 |
| 4,228,697 A * | 10/1980 | Miller | 475/276 |
| 4,395,925 A | 8/1983 | Gaus | |
| 6,572,507 B1 | 6/2003 | Korkmaz et al. | |
| 6,960,149 B2 | 11/2005 | Ziemer | |
| 7,549,942 B2 | 6/2009 | Gumpoltsberger | |
| 7,695,398 B2 | 4/2010 | Phillips et al. | |
| 7,699,743 B2 | 4/2010 | Diosi et al. | |
| 8,210,981 B2 | 7/2012 | Bauknecht et al. | |
| 8,210,982 B2 | 7/2012 | Gumpoltsberger et al. | |
| 8,398,522 B2 | 3/2013 | Bauknecht et al. | |
| 8,523,729 B2 * | 9/2013 | Hart et al. | 475/282 |
| 2009/0197734 A1 | 8/2009 | Phillips et al. | |
| 2009/0209389 A1 | 8/2009 | Phillips et al. | |
| 2013/0225358 A1* | 8/2013 | Singh | 475/276 |
| 2014/0187378 A1* | 7/2014 | Thomas et al. | 475/288 |

FOREIGN PATENT DOCUMENTS

| | | |
|---|---|---|
| DE | 101 15 995 A1 | 10/2002 |
| DE | 10 2005 010 210 A1 | 9/2006 |
| DE | 10 2006 006 637 A1 | 9/2007 |
| DE | 10 2008 031 970 A1 | 1/2009 |
| DE | 10 2008 000 428 A1 | 9/2009 |
| DE | 10 2008 000 429 A1 | 9/2009 |
| DE | 10 2008 041 195 A1 | 2/2010 |
| DE | 10 2009 019 046 A1 | 11/2010 |
| DE | 10 2009 020 442 A1 | 11/2010 |
| DE | 10 2009 028 670 A1 | 2/2011 |
| JP | 2005-98433 A | 4/2005 |
| JP | 2005-172123 A | 6/2005 |
| JP | 2006-349153 A | 12/2006 |
| WO | WO 2013159997 A1 * | 10/2013 |

OTHER PUBLICATIONS

German Search Report Corresponding to 10 2012 206 773.6 mailed Nov. 13, 2012.
German Search Report Corresponding to 10 2012 206 774.4 mailed Nov. 13, 2012.
German Search Report Corresponding to 10 2012 206 778.7 mailed Nov. 13, 2012.
German Search Report Corresponding to 10 2012 206 782.5 mailed Nov. 13, 2012.
German Search Report Corresponding to 10 2012 206 792.2 mailed Nov. 13, 2012.
German Search Report Corresponding to 10 2012 206 809.0 mailed Nov. 13, 2012.
German Search Report Corresponding to 10 2012 206 817.1 mailed Nov. 13, 2012.
German Search Report Corresponding to 10 2012 206 819.8 mailed Nov. 13, 2012.
International Search Report Corresponding to PCT/EP2013/055066 mailed May 21, 2013.
International Search Report Corresponding to PCT/EP2013/055083 mailed May 21, 2013.
International Search Report Corresponding to PCT/EP2013/055079 mailed May 21, 2013.
International Search Report Corresponding to PCT/EP2013/055068 mailed May 22, 2013.
International Search Report Corresponding to PCT/EP2013/055081 mailed May 22, 2013.
International Search Report Corresponding to PCT/EP2013/055070 mailed May 21, 2013.
International Search Report Corresponding to PCT/EP2013/055077 mailed May 21, 2013.
International Search Report Corresponding to PCT/EP2013/055071 mailed May 21, 2013.
International Search Report Corresponding to PCT/EP2013/055076 mailed May 21, 2013.
Written Opinion Corresponding to PCT/EP2013/055079 mailed May 21, 2013.

* cited by examiner

MULTI-SPEED GEARBOX

This application is a National Stage completion of PCT/EP2013/055079 filed Mar. 13, 2013, which claims priority from German patent application serial no. 10 2012 206 774.4 filed Apr. 25, 2012.

FIELD OF THE INVENTION

The present invention relates to a multi-stage transmission of a planetary design, in particular an automatic transmission for a motor.

BACKGROUND OF THE INVENTION

According to the prior art, automatic transmissions, particularly for motor vehicles, comprise planetary gear sets that are shifted using friction elements or shift elements such as clutches and brakes, and typically are connected to a start-up element, such as a hydrodynamic torque converter or a fluid coupling, that is subject to a slip effect and is optionally provided with a lock-up clutch.

Such an automatic transmission is known, for example, from DE 199 12 480 B4 by the applicant. It comprises three single-carrier planetary gear sets, as well as three brakes and two clutches for shifting six forward gears and one reverse gear, a input shaft and an output shaft, wherein the carrier for the first planetary gear set is continuously connected to the ring gear of the second planetary gear set, and the carrier for the second planetary gear set is continuously connected to the ring gear of the third planetary gear set, and the input shaft is directly connected to the sun gear of the second planetary gear set.

Furthermore, in the known transmission, the input shaft is connectable by means of the first clutch to the sun gear of the first planetary gear set, and by means of the second clutch to the carrier of the first planetary set, wherein the sun gear of the first planetary gear set is connectable by means of the first brake to a housing of the transmission, and the carrier of the first planetary gear set is connectable by means of the second brake to the housing of the transmission, wherein the sun gear of the third planetary gear set is connectable by means of the third brake to the housing of the transmission. The input shaft of the transmission is continuously connected to the carrier for the third planetary gear set and the ring gear of the first planetary gear set.

Furthermore, a nine-speed multi-stage transmission is known from DE 29 36 969 A1; it comprises eight shift elements and four planetary gear sets, wherein one planetary gear set serves as a front-mounted gear set and the main gearbox includes a Simpson set and a further planetary gear set serving as a reverse gearing.

Further multistage transmissiOns are known, for example, from the applicant's DE 10 2005 010 210 A1 and DE 10 2006 006 637 A1.

Automatically shiftable vehicle transmissions, of a planetary design, are already generally described numerous times in the prior art and are continually undergoing further development and improvemeht. These transmissions should have a relatively simple design, in particular requiring a low number of shift elements, and minimize the need for double shifting when sequential shifting is performed, i.e., activation and/or deactivation of two shift elements, thereby ensuring that only one shift element is ever switched when shifting is performed in defined groups of gears.

DE 10 2008 000 428 A1 by the applicant discloses a multistage transmission of a planetary design which includes an input shaft and an output shaft which are disposed in a housing. With the known transmission, at least four planetary gear sets, hereinafter termed the first, second, third and fourth planetary gear sets, at least eight rotatable shafts, hereinafter termed the drive shaft, output shaft, third, fourth, fifth, sixth, seventh and eighth shaft, as well as at least six shaft elements comprising brakes and clutches are provided, the selective engagement of which generates different transmission ratios between the driveshaft and the output shaft such that preferably nine forward gears and one reverse gear are feasible.

The first and second planetary gear sets, which are preferably designed as minus planetary gear sets, i.e., with a negative stationary transmission, form a shiftable front-mounted gear set, wherein the third and fourth planetary gear sets form a main gear set.

In the known multi-stage transmission, the carriers of the first and the second planetary gear sets are coupled together via the fourth shaft which is connected to an element of the main gear set, the ring gear of the first planetary gear set is coupled to the sun gear of the second planetary gear set via the eighth shaft, which is detachably connectable to the drive shaft via the first clutch, and the sun gear of the first planetary gear set can be coupled to a housing of the transmission by means of the third shaft, via a first brake, and is detachably connectable to the drive shaft via a second clutch, wherein the ring gear of the second planetary gear set can be coupled to a housing of the transmission by means of the fifth shaft via a second brake. In addition, the seventh shaft is constantly connected to at least one element of the main gear set, and can be coupled to the housing of the transmission via a third brake, and the sixth shaft is constantly connected to at least one further element of the main gear set and is detachably connectable to the drive shaft, via a third clutch; and the output shaft is constantly connected at least to one further element of the main gear set.

In the known transmission, the fourth shaft is preferably constantly connected to the ring gear of the third planetary gear set, the sixth shaft is constantly connected to the ring gear of the fourth planetary gear set and to the carrier of the third planetary gear set, and is detachably connectable to the drive shaft via the third clutch. Furthermore, the seventh shaft is constantly connected to the sun gears of the third and fourth planetary gear sets, and can be coupled to a housing of the transmission via the third brake. In this case, the output drive is produced via the output shaft, which is constantly connected to the carrier of the fourth planetary gear set. Furthermore, the third and fourth planetary gear sets can be combined or reduced to a Ravigneaux set having a common carrier and a common ring gear.

According to the prior art, the shift elements of a multistage transmission designed in this manner, which are normally designed as multi-disk clutches or brakes, are hydraulically actuated which disadvantageously leads to high hydraulic losses. To circumvent this actuation loss, it would be particularly advantageous to use shift elements which can be actuated, as needed, such as electromechanically actuatable shift elements.

Shift elements which can be actuated, as needed, can in particular be understood as shift elements that require no or less energy to maintain the gear state than to change the gear state.

To enable the use of shift elements that can be actuated as needed, the shift elements, in particular the clutches, must be easily accessible from the outside.

SUMMARY OF THE INVENTION

The object of the present invention is to propose a multistage transmission of the initially-cited type, which has nine forward gears and one reverse gear having a sufficient transmission ratio, in which the design complexity, the component stress and construction size are optimized, and efficiency is furthermore improved. In addition, the shift elements of the transmission should be readily accessible from the outside which enables the installation of shift elements which can be actuated, as needed. Furthermore, the transmission should be suitable for both a standard design and front-transverse design.

Accordingly, a multi-stage transmission, according to the invention, of a planetary design is proposed which has an input shaft and an output shaft which are disposed in a housing. In addition, there are provided at least four planetary gear sets which are designated, in the following, as the first, second, third, and fourth planetary gear sets, eight rotatable shafts which are designated, in the following, as the drive shaft, output shaft, third, fourth, fifth, sixth, seventh, and eighth shafts, and at least six shift elements preferably designed lamellar shift elements orform-locking shift elements, comprising brakes and clutches, whose selective engagement produces different transmission ratios between the drive shaft and the output shaft, and therefore preferably nine forward gears and one reverse gear can be realized.

The first planetary gear set of the transmission is preferably designed as a plus planetary gear set, wherein the second, third and fourth planetary gear sets are designed as minus planetary gear sets.

As is well known, a simple minus planetary gear set comprises a sun gear, a ring gear, and a carrier on which the planetary gears are rotatably carried, the planetary gears meshing with the sun gear and the ring gear. As a result, when the carrier is fixed, the ring gear has a direction of rotation that is opposite that of the sun gear. In contrast, a simple plus planetary gear set comprises a sun gear, a ring gear and a carrier, on which inner and outer planet gears are rotatably carried, wherein all inner planet gears mesh with the sun gear and all outer planet gears mesh with the ring gear, and each inner planet gear meshes with only one outer planet gear. As a result, when the carrier is fixed, the ring gear has the same direction of rotation as the sun gear, and a positive stationary transmission ratio results.

According to a preferred embodiment of the invention, the sun gear of the first planetary gear set is connected to a fifth shaft which can be coupled, by means of a second brake, to the housing of the transmission and is detachably connectable, by means of a first clutch, to the driveshaft, wherein the driveshaft is detachably connectable, by means of a second clutch, to the seventh shaft connected to the carrier of the second planetary gear set and is detachably connectable, by means of a third clutch, to the eighth shaft which is connected to the carrier of the first planetary gear set and the sun gear of the second planetary gear set. The seventh shaft is detachably connectable, by means of a fourth clutch, to the third shaft connected to the ring gear of the third planetary gear set.

Furthermore, the sixth shaft is connected to the ring gear of the second planetary gear set and the carrier of the fourth planetary gear set, wherein the fourth shaft is connected to the ring gear of the first planetary gear set and the sun gear of the fourth planetary gear set, and can be coupled, by means of a first brake, to the housing.

Furthermore, the drive shaft is connected to the carrier of the third planetary gear set and the ring gear of the fourth planetary gear set, wherein the sun gear of the third planetary gear set is coupled to the housing.

Since the first, second and third clutches are disposed on the driveshaft of the transmission, two additional switch shift elements are designed as brakes, and the fourth clutch, viewed radially, is disposed in proximity to the housing, ready accessibility of all of the transmission shift elements is achieved, which allows the shift elements to be designed as shift elements which can be actuated, as needed. In the context of additional embodiments of the invention, shift elements of the transmission can be designed, inter alia, as hydraulically-actuatable shift elements.

Furthermore, transmission ratios result that are particularly suitable for passenger vehicles, and in a greater overall gear ratio of the multi-stage transmission, thereby improving driving smoothness and significantly reducing fuel consumption.

In addition, design complexity is significantly reduced with the multi-stage transmission according to the invention due to a low number of shift elements. Using the multi-stage transmission according to the invention, it is advantageously possible to perform a start-up using a hydrodynamic converter, an external start-up clutch, or any other suitable external start-up element. It is also conceivable to perform a start-up using a start-up element integrated in the transmission. Preferably, a shift element that is actuated in the first forward gear and in the reverse gear is suitable for this.

Moreover, the multi-stage transmission, according to the invention, results in good efficiency in the main drive gears with respect to drag losses and gearing losses.

Advantageously, low torques exist in the shift elements and in the planetary gear sets of the multi-stage transmission, thereby advantageously reducing wear in the multi-stage transmission. In addition, the low torques make it possible to utilize correspondingly low dimensions, thereby reducing the necessary installation space and related costs. Furthermore, the rotational speeds of the shafts, shift elements, and planetary gear sets are low.

In addition, the transmission, according to the invention, is designed to allow adaptability to different drive train embodiments in terms of power flow direction and spatial aspects.

BRIEF DESCRIPTION OF THE DRAWINGS

The invention is described in greater detail in the following, as an example, with reference to the attached Figures. They show.

DETAILED DESCRIPTION OF THE PREFERRED EMBODIMENTS

Figures 1, 2:
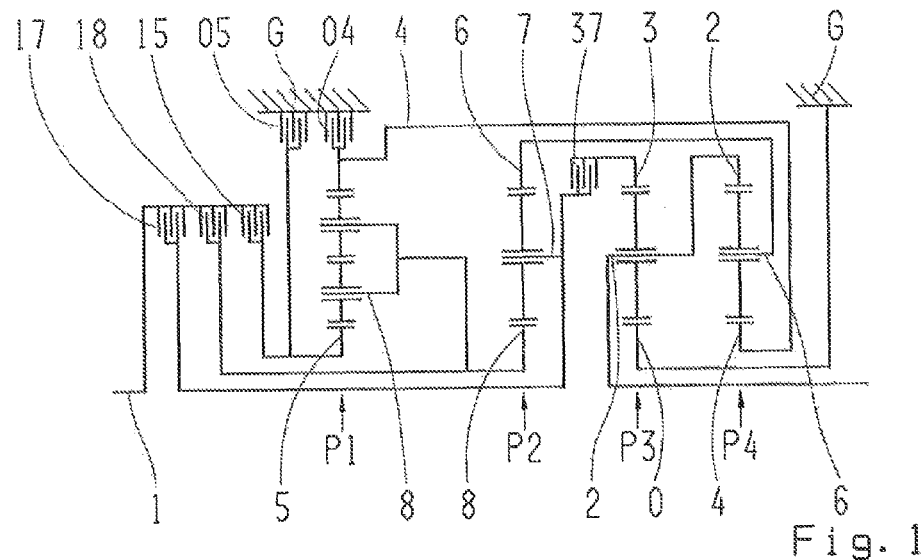
FIG. 1: A schematic view of a preferred embodiment of a multi-stage transmission according to the invention.
FIG. 2: An example of a shift pattern for a multi-stage transmission according to FIG. 1.

FIG. 1 shows a multi-stage transmission, according to the invention, which has a drive shaft 1, an output shaft 2, and four planetary gear sets P1, P2, P3 and P4 which are disposed in a housing G. The second, third and fourth planetary gear set P2, P3, P4 in the example shown in FIG. 1 are designed as minus planetary gear sets, wherein the first planetary gear set P1 is designed as a plus planetary gear set. According to the invention, at least one of the additional planetary gear sets P2, P3, P4 can be designed as a plus planetary gear set if the carrier and the ring gear connections are simultaneously exchanged, and the value of the stationary transmission ratio is increased by 1 in comparison to the design as a minus planetary gear set.

Viewed axially, the planetary gear sets P1, P2, P3, P4, in the portrayed exemplary embodiment, are disposed in the sequence of the first planetary gear set P1, the second planetary gear set P2, the third planetary gear set P3, and the fourth planetary gear P4. According to the invention, the actual sequence of individual planetary gear sets and the arrangement of the shift elements are freely selectable as permitted by the connectivity of the elements.

As shown in FIG. 1, six shift elements are provided, namely, two brakes 04, 05 and four clutches 15, 17, 18 and 37. The spatial disposition of the shift elements can be arbitrary, and is limited only by the dimensions of the outer design. The transmission's clutches and brakes are preferably designed as friction shift elements or lamellar shift elements, but they can also be designed as form-locking shift elements.

Selective shifting of nine forward gears and one reverse gear can be realized using these shift elements. The multi-stage transmission, according to the invention, has a total of eight rotatable shafts, namely, the shafts 1, 2, 3, 4, 5, 6, 7 and 8, wherein the drive shaft is the first shaft 1, and the output shaft is the second shaft 2 of the transmission.

According to the invention, in the multi-stage transmission according to FIG. 1, the sun gear of the first planetary gear set P1 is connected to the fifth shaft 5 which can be coupled, by means of a second brake 05, to the housing G of the transmission, and is detachably connectable, by means of a first clutch 15, to the driveshaft 1, wherein the driveshaft 1 is detachably connectable, by means of a second clutch 17, to the seventh shaft 7 connected to the carrier of the second planetary gear set P2, and is detachably connectable, by means of a third clutch 18, to the eighth shaft 8 which is connected to the carrier of the first planetary gear set P1 and to the sun gear of the second planetary gear set P2, wherein the seventh shaft 7 is detachably connectable, by means of a fourth clutch 37, to the third shaft 3 connected to the ring gear of the third planetary gear set P3.

As can be seen in FIG. 1, the sixth shaft 6 is connected to the ring gear of the second planetary gear set P2 and the carrier of the fourth planetary gear set P4, wherein the fourth shaft 4 is connected to the ring gear of the first planetary gear set P1 and the sun gear of the fourth planetary gear set P4 and can be coupled, by means of a first brake 04, to the housing G.

Furthermore, the drive shaft 2 of the transmission is connected to the carrier of the third planetary gear set P3 and the ring gear of the fourth planetary gear set P4, wherein the sun gear of the third planetary gear set P3 is coupled to the housing G (shaft 0).

Viewed axially, the first, second and third clutch 15, 17, 18 can be disposed next to each other and designed as lamellar shift elements, and have a common outer clutch disc carrier. In the portrayed exemplary embodiment, particularly the fourth clutch 37 is suitable for a design as a jaw clutch element which significantly improves usage.

FIG. 2 shows an example of a shift pattern of a multi-stage transmission according to FIG. 1. Three shift elements are engaged for every gear. The shift pattern shows, as examples, the particular transmission ratios i of the individual gear steps and, to be determined therefrom, the gear increments or step changes φ to the next higher gear, wherein the value 8.964 is the transmission ratio spread.

The values for the stationary transmission ratios of the planetary gear sets P1, P2, P3, and P4, designed as minus planetary gear sets, are 1.946, −3.676, −2.767 and −2.062, respectively. FIG. 2 shows that only one shift element must be engaged and one shift element must be disengaged when shifting sequentially, since two neighbouring gear steps jointly use two shift elements. It is also shown that a large transmission ratio spread is attained with small gear increments.

The first forward gear is attained by engaging the first brake 04 and the third and fourth clutches 18, 37; the second forward gear is attained by engaging the second brake 05 and the third and fourth clutches 18, 37; the third forward gear is attained by engaging the first, third and fourth clutches 15, 18, 37; the fourth forward gear is attained by engaging the first, second and fourth clutches 15, 17, 37; the fifth forward gear, which for example is designed as a direct gear, is attained by engaging the first, second and third clutches 15, 17, 18; the sixth forward gear is attained by engaging the second brake 05 and the second and third clutches 17, 18; the seventh forward gear is attained by engaging the first brake 04 and the second and third clutches 17, 18; the eighth forward gear is attained by engaging the first and the second brakes 04, 05 and the second clutch 17; and the ninth forward gear is attained by engaging the first brake 04 and the first and second clutches 15, 17, wherein the reverse gear is attained by engaging the brake 04 and the first and fourth clutches 15, 37.

Alternately, the fourth forward gear can be shifted by additional shifting combinations which are identified in FIG. 2 with M. Accordingly, the fourth forward gear can be attained by engaging the first brake 04 and the second and fourth clutches 17, 37, or by engaging the first, second and fourth clutches 15, 17, 37, or by engaging the second brake 05 and the second and fourth clutches 17, 37.

Since the first brake 04 and the first, third and fourth clutches 15, 18, 37 are engaged in the first forward gear and/or in the reverse gear, these shift elements can be used as start-up elements.

According to the invention, different gear increments also result from the same gear pattern depending on the shift logic, thereby making it possible to implement an application-specific or a vehicle-specific variation.

According to the invention, it is furthermore optionally possible to provide additional freewheels at each suitable location of the multi-staged transmission, for example, between a shaft and the housing, or possibly to connect two shafts.

An axle differential and/or a distributor differential can be disposed on the drive side or on the output side.

Within the scope of an advantageous development of the invention, the drive shaft 1 can be separated from a drive motor, as needed, by a clutch element, wherein a hydrodynamic converter, a hydraulic clutch, a dry start-up clutch, a wet start-up clutch, a magnetic powder clutch, or a centrifugal clutch can be used as the clutch element or the like. It is also possible to dispose such a start-up element in the power flow direction after the transmission wherein, in this case, the drive shaft 1 is continuously connected to the crankshaft of the drive motor.

The multi-stage transmission, according to the invention, also makes it possible to situate a torsional-vibration damper between the drive motor and the transmission.

Within the scope of a further, not represented embodiment of the invention, a wear-free brake, for instance, a hydraulic or electric retarder or the like, can be disposed on each shaft, preferably on the drive shaft 1 or the output shaft 2, which is of special significance for use in commercial vehicles in particular. Furthermore, a power take-off drive can be provided on each shaft, preferably on the input shaft 1 or the output shaft 2, for driving additional assemblies.

The friction shift elements that are used can be designed as power shiftable clutches or brakes. In particular, force locking clutches or brakes can be used, for instance, lamellar clutches, band brakes, and/or cone clutches.

A further advantage of the multi-stage transmission presented here is that an electric machine can be attached to each shaft as a generator and/or as an additional drive machine.

REFERENCE SIGNS 0 shaft
1 first shaft, input shaft
2 second shaft, output shaft
3 third shaft
4 fourth shaft 5 fifth shaft
6 sixth shaft
7 seventh shaft
8 eighth shaft
04 first brake
05 second brake
15 first clutch
17 second clutch
18 third clutch
37 fourth clutch
G housing
P1 first planetary gear set
P2 second planetary gear set
P3 third planetary gear set
P4 fourth planetary gear set
i transmission ratio
φ step change

The invention claimed is:

1. A multi-stage transmission of a planetary design comprising:
   a driveshaft (1),
   an output shaft (2),
   first, second, third and fourth planetary gear sets (P1, P2, P3, P4) which are disposed within a housing (G) and each of the first, the second, the third and the fourth planetary gear sets comprises a ring gear, a carrier, planet gears and a sun gear,
   third, fourth, fifth, six, seventh and eighth rotatable shafts (3, 4, 5, 6, 7, 8),
   six shift elements (04, 05, 15, 17, 18, 37) comprising brakes (04, 05) and clutches (15, 17, 18, 37), and selective engagement of the six shift elements (04, 05, 15, 17, 18, 37) generates different transmission ratios between the driveshaft (1) and the output shaft (2) such that nine forward gears and one reverse gear are implementable,
   wherein the sun gear of the first planetary gear set (P1) is connected to the fifth shaft (5), the fifth shaft (5) can be coupled to the housing (G) by engagement of a second brake (05) and the fifth shaft (5) can be detachably connected, by engagement of a first clutch (15), to the drive shaft (1),
   the drive shaft (1) can be detachably connected, by engagement of a second clutch (17), to the seventh shaft (7) connected to the carrier of the second planetary gear set (P2),
   the drive shaft (1) can be detachably connected, by engagement of a third clutch (18), to the eighth shaft (8) which is connected to both the carrier of the first planetary gear set (P1) and to the sun gear of the second planetary gear set (P2),
   the seventh shaft (7) can be detachably connected, by engagement of a fourth clutch (37), to the third shaft (3) which is connected to the ring gear of the third planetary gear set (P3),
   the sixth shaft (6) is connected to both the ring gear of the second planetary gear set (P2) and the carrier of the fourth planetary gear set (P4),
   the fourth shaft (4) is connected to both the ring gear of the first planetary gear set (P1) and to the sun gear of the fourth planetary gear set (P4), and the fourth shaft (4) can be coupled to the housing (G) by engagement of a first brake (04),
   the sun gear of the third planetary gear set (P3) is coupled to the housing (G), and
   the output shaft (2) is directly connected to both the carrier of the third planetary gear set (P3) and to the ring gear of the fourth planetary gear set (P4).

2. The multi-stage transmission according to claim 1, wherein the first planetary gear set (P1) is designed as a plus planetary gear set, and the second, the third and the fourth planetary gear sets (P2, P3, P4) are designed as minus planetary gear sets.

3. The mufti-stage transmission according to claim 1, wherein, when viewed axially, the first, the second, the third and the fourth planetary gear sets are disposed in a sequence of the first planetary gear set (P1), the second planetary gear set (P2), the third planetary gear set (P3) and the fourth planetary gear set (P4).

4. The mufti-stage transmission according to claim 1, wherein the shift elements (03, 04, 05, 15, 17, 18) of the transmission are designed as shift elements which can be actuated as needed.

5. The multistage transmission according to claim 1, wherein the fourth clutch (37) is designed as a form-locking shift element.

6. The multi-stage transmission according to claim 1, wherein the first forward gear is attained by engaging the first brake (04) and the third and the fourth clutches (18, 37);
   the second forward gear is attained by engaging the second brake (05) and the third and the fourth clutches (18, 37);
   the third forward gear is attained by engaging the first, the third and the fourth clutches (15, 18, 37);
   the fourth forward gear is attained by engaging the first, the second and the fourth clutches (15, 17, 37);
   the fifth forward gear is attained by engaging the first, the second and the third clutches (15, 17, 18);
   the sixth forward gear is attained by engaging the second brake (05) and the second and the third clutches (17, 18);
   the seventh forward gear is attained by engaging the first brake (04) and the second and the third clutches (17, 18);
   the eighth forward gear is attained by engaging the first and the second brakes (04, 05) and the second clutch (17);
   the ninth forward gear is attained by engaging the first brake (04) and the first and the second clutches (15, 17); and
   the reverse gear is attained by engaging the first brake (04) and the first and the fourth clutches (15, 37).

7. The multi-stage transmission according to claim 1, wherein the first forward gear is attained by engaging the first brake (04) and the third and the fourth clutches (18, 37);
   the second forward gear is attained by engaging the second brake (05) and the third and the fourth clutches (18, 37);
   the third forward gear is attained by engaging the first, the third and the fourth clutches (15, 18, 37);
   the fourth forward gear is attained by engaging the first brake (04) and the second and the fourth clutches (17, 37);
   the fifth forward gear is attained by engaging the first, the second and the third clutches (15, 17, 18);
   the sixth forward gear is attained by engaging the second brake (05) and the second and the third clutches (17, 18);
   the seventh forward gear is attained by engaging the first brake (04) and the second and the third clutches (17, 18);
   the eighth forward gear is attained by engaging the first and the second brakes (04, 05) and the second clutch (17);
   the ninth forward gear is attained by engaging the first brake (04) and the first and the second clutches (15, 17); and
   the reverse gear is attained by engaging the first brake (04) and the first and the fourth clutches (15, 37).

8. The multi-stage transmission according to claim 2, wherein the first forward gear is attained by engaging the first brake (04) and the third and the fourth clutches (18, 37);

the second forward gear is attained by engaging the second brake (05) and the third and the fourth clutches (18, 37);

the third forward gear is attained by engaging the first, the third and the fourth clutches (15, 18, 37);

the fourth forward gear is attained by engaging the first, the second and the fourth clutches (15, 17, 37);

the fifth forward gear is attained by engaging the first, the second and the third clutches (15, 17, 18);

the sixth forward gear is attained by engaging the second brake (05) and the second and the third clutches (17, 18);

the seventh forward gear is attained by engaging the first brake (04) and the second and the third clutches (17, 18);

the eighth forward gear is attained by engaging the first and the second brakes (04, 05) and the second clutch (17);

the ninth forward gear is attained by engaging the first brake (04) and the first and the second clutches (15, 17); and the reverse gear is attained by engaging the first brake (04) and the first and the fourth clutches (15, 37).

9. The multi-stage transmission according to claim 1, wherein the first forward gear is attained by engaging the first brake (04) and the third and the fourth clutches (18, 37);

the second forward gear is attained by engaging the second brake (05) and the third and the fourth clutches (18, 37);

the third forward gear is attained by engaging the first, the third and the fourth clutches (15, 18, 37);

the fourth forward gear is attained by engaging the second brake (05) and the second and the fourth clutches (17, 37);

the fifth forward gear is attained by engaging the first, the second and the third clutches (15, 17, 18);

the sixth forward gear is attained by engaging the second brake (05) and the second and the third clutches (17, 18);

the seventh forward gear is attained by engaging the first brake (04) and the second and the third clutches (17, 18);

the eighth forward gear is attained by engaging the first and the second brakes (04, 05) and the second clutch (17);

the ninth forward gear is attained by engaging the first brake (04) and the first and the second clutches (15, 17); and the reverse gear is attained by engaging the first brake (04) and the first and the fourth clutches (15, 37).

10. The multi-stage transmission according to claim 1, wherein the multi-stage transmission is an automatic transmission for a motor vehicle.

11. A multi-stage transmission of a planetary design comprising:

a driveshaft, an output shaft, first, second, third and fourth planetary gear sets which are disposed in a housing, and each of the first, the second, the third and the fourth planetary gear sets comprises a ring gear, a carrier, planet gears and a sun gear, third, fourth, fifth, six, seventh and eighth rotatable shafts, six shift elements comprising brakes and clutches, and selective engagement of the six shift elements generates different transmission ratios between the driveshaft and the output shaft such that nine forward gears and one reverse gear are implementable, wherein the sun gear of the first planetary gear set is connected to the fifth shaft, the fifth shaft can be coupled to the housing by engagement of a second brake and the fifth shaft can be detachably connected, by engagement of a first clutch, to the drive shaft, the drive shaft can be detachably connected, by engagement of a second clutch, to the seventh shaft connected to the carrier of the second planetary gear set, the drive shaft can be detachably connected, by engagement of a third clutch, to the eighth shaft which is connected to both the carrier of the first planetary gear set and to the sun gear of the second planetary gear set, the seventh shaft can be detachably connected, by engagement of a fourth clutch, to the third shaft which is connected to the ring gear of the third planetary gear set, the sixth shaft is connected to both the ring gear of the second planetary gear set and the carrier of the fourth planetary gear set, the fourth shaft is connected to both the ring gear of the first planetary gear set and to the sun gear of the fourth planetary gear set, and the fourth shaft can be coupled to the housing by engagement of a first brake, the sun gear of the third planetary gear set is coupled to the housing, and the output shaft is directly connected to both the carrier of the third planetary gear set (P3) and to the ring gear of the fourth planetary gear set (P4).

12. The multi-stage transmission according to claim 11, wherein the multi-stage transmission is an automatic transmission for a motor vehicle.

13. The multi-stage transmission according to claim 11, wherein the first forward gear is attained by engaging the first brake and the third and the fourth clutches;

the second forward gear is attained by engaging the second brake and the third and the fourth clutches;

the third forward gear is attained by engaging the first, the third and the fourth clutches;

the fourth forward gear is attained by engaging the first, the second and the fourth clutches;

the fifth forward gear is attained by engaging the first, the second and the third clutches;

the sixth forward gear is attained by engaging the second brake and the second and the third clutches;

the seventh forward gear is attained by engaging the first brake and the second and the third clutches;

the eighth forward gear is attained by engaging the first and the second brakes and the second clutch;

the ninth forward gear is attained by engaging the first brake and the first and the second clutches; and the reverse gear is attained by engaging the first brake and the first and the fourth clutches.

14. The mufti-stage transmission according to claim 11, wherein the first forward gear is attained by engaging the first brake and the third and the fourth clutches;

the second forward gear is attained by engaging the second brake and the third and the fourth clutches;

the third forward gear is attained by engaging the first, the third and the fourth clutches;

the fourth forward gear is attained by engaging the first brake and the second and the fourth clutches;

the fifth forward gear is attained by engaging the first, the second and the third clutches;

the sixth forward gear is attained by engaging the second brake and the second and the third clutches;

the seventh forward gear is attained by engaging the first brake and the second and the third clutches;

the eighth forward gear is attained by engaging the first and the second brakes and the second clutch;

the ninth forward gear is attained by engaging the first brake and the first and the second clutches; and the reverse gear is attained by engaging the first brake and the first and the fourth clutches.

15. The multi-stage transmission according to claim 12, wherein the first forward gear is attained by engaging the first brake and the third and the fourth clutches;

the second forward gear is attained by engaging the second brake and the third and the fourth clutches;
the third forward gear is attained by engaging the first, the third and the fourth clutches;
the fourth forward gear is attained by engaging the first, the second and the fourth clutches;
the fifth forward gear is attained by engaging the first, the second and the third clutches;
the sixth forward gear is attained by engaging the second brake and the second and the third clutches;
the seventh forward gear is attained by engaging the first brake and the second and the third clutches;
the eighth forward gear is attained by engaging the first and the second brakes and the second clutch;
the ninth forward gear is attained by engaging the first brake and the first and the second clutches; and
the reverse gear is attained by engaging the first brake and the first and the fourth clutches.

16. The multi-stage transmission according to claim 1, wherein the first forward gear is attained by engaging the first brake and the third and the fourth clutches;
the second forward gear is attained by engaging the second brake and the third and the fourth clutches;
the third forward gear is attained by engaging the first, the third and the fourth clutches;
the fourth forward gear is attained by engaging the second brake and the second and the fourth clutches;
the fifth forward gear is attained by engaging the first, the second and the third clutches;
the sixth forward gear is attained by engaging the second brake and the second and the third clutches;
the seventh forward gear is attained by engaging the first brake and the second and the third clutches;
the eighth forward gear is attained by engaging the first and the second brakes and the second clutch;
the ninth forward gear is attained by engaging the first brake and the first and the second clutches; and
the reverse gear is attained by engaging the first brake and the first and the fourth clutches.

* * * * *